UNITED STATES PATENT OFFICE.

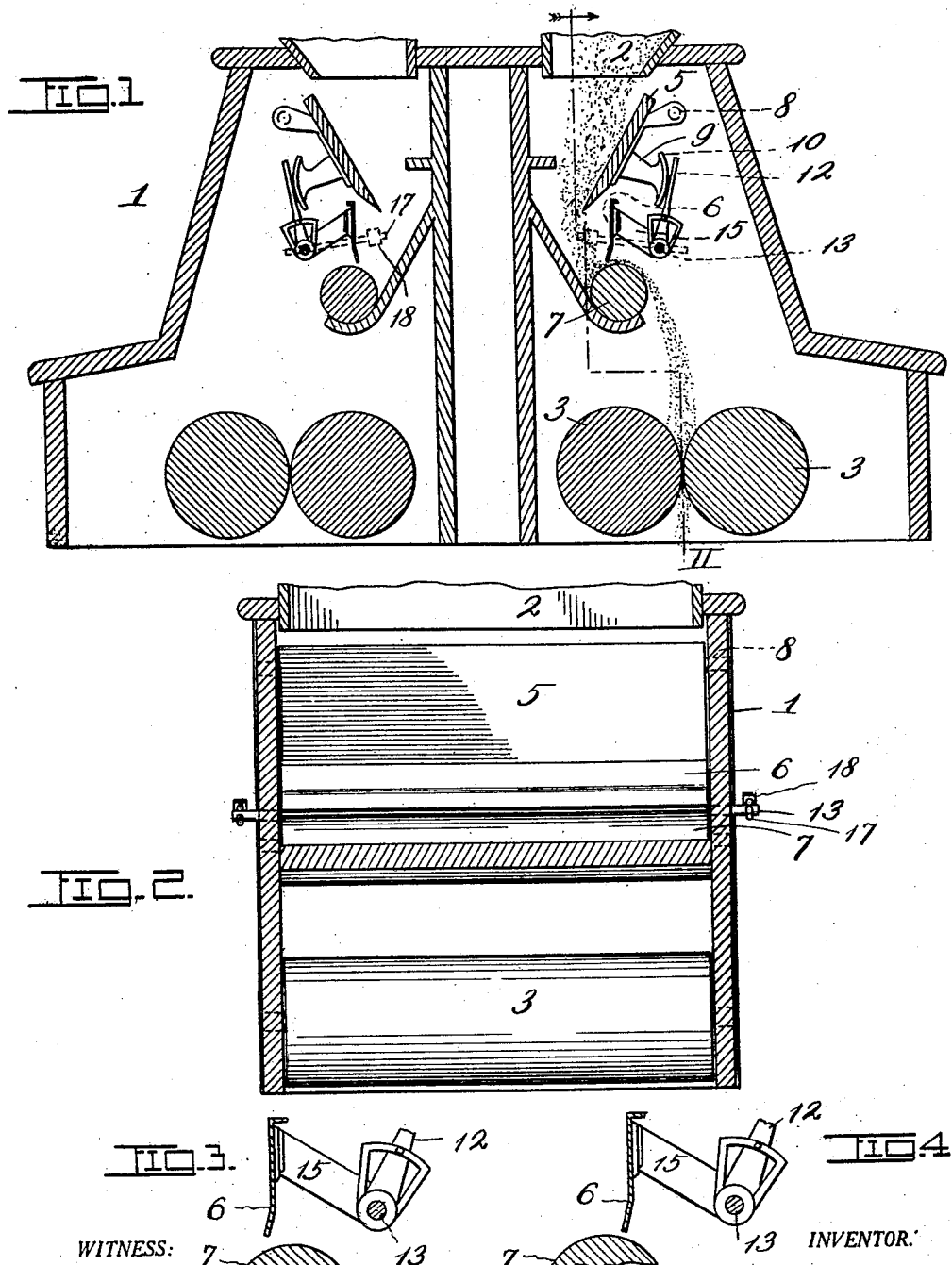

PHILIP H. LAWSON, OF ST. JOSEPH, MISSOURI.

AUTOMATIC FEEDER FOR ROLLER-MILLS.

1,324,832.  Specification of Letters Patent.  Patented Dec. 16, 1919.

Application filed July 2, 1917. Serial No. 178,152.

*To all whom it may concern:*

Be it known that I, PHILIP H. LAWSON, a citizen of the United States, residing at St. Joseph, in the county of Buchanan and State of Missouri, have invented certain new and useful Improvements in Automatic Feeders for Roller-Mills, of which the following is a specification.

My invention relates to improvements in automatic feeders for roller mills, and my principal object is to provide apparatus of this character whereby grain can be fed to the crushing rolls in a more uniform manner than heretofore.

An important feature of the invention resides in locating the feeder gates in a certain position relative to the feed rolls, so that slight upward movement of said gates will insure a sufficient opening between them and the feed rolls to permit the passage of a uniform stream of grain the full length of said feed rolls.

In order that the invention may be fully understood, reference will now be made to the accompanying drawings, in which:

Figure 1 is a vertical, longitudinal sectional view of an automatic feeder constructed in accordance with my invention.

Fig. 2 is an irregular vertical cross sectional view on line II of Fig. 1.

Fig. 3 is an enlarged view of one of the feed rolls and the gate associated therewith.

Fig. 4 shows a modified arrangement of a gate and a feed roll.

Referring now in detail to the drawings, in which like reference numerals indicate corresponding parts throughout the several views, 1 designates the housing of the feeder, and 2 the hoppers which supply the feeder with grain or stock to be broken by the crushing rolls 3. In its passage from each hopper 2 to each pair of crushing rolls 3, the grain is controlled by a controller board 5, a gate 6, and a feed roll 7. The controller board 5 is operably-mounted on pivots 8 and has a rearwardly projecting arm 9, with a curved face 10 which contacts a lever 12 fixed upon a shaft 13, journaled at opposite sides of the housing 1. The gate 6 is carried by a pair of arms 15, fixed to the shaft 13, which is provided at each end outside of the housing with a rod 17 having a counterweight 18, which tends to hold the gate 6 in closed position against the adjacent feed roll 7.

In practice, the pressure of the grain descending from the hopper 2 swings the controller board 5 backwardly, causing it to rock the lever 12 and swing the gate 6 upward, as disclosed by Fig. 1. The grain is then fed in a uniform stream to the crushing rolls 3 by the feed roll 7.

As disclosed by Fig. 3, the gate 6 is placed slightly in advance of a vertical line drawn through the center of the feed roll 7, while the shaft 13 is positioned at the rear of said vertical line. By thus positioning the gate 6 and the shaft 13, slight upward movement of the gate will cause it to clear the feed roll 7 sufficiently to permit a uniform stream of stock to pass over the entire length of said feed roll, whereas if the gate were positioned at the rear of the center line like the shaft 13, as disclosed by Fig. 4, the same upward movement would not cause said gate to clear the feed roll to the same degree, as the arc described by said gate would follow the curvature of the feed roll to a certain extent. This would result in reducing the opening between the lower edge of the gate 6 and the feed roll 7, and cause said opening to become clogged more or less, so that the grain instead of being fed in a continuous stream over the entire length of the feed roll 7 would be interrupted wherever the clogging occurred, and thus materially reduce the capacity of the feeder.

From the foregoing description, it is apparent that I have produced a feeder whereby a uniform stream of stock is supplied to the crushing rolls 3, and while I have shown and described the preferred form of my invention, I reserve the right to make such changes in the construction, combination, and arrangement of parts as properly fall within the spirit and scope of the appended claims.

Having thus described my invention, what I claim and desire to secure by Letters Patent, is:

In a feeder of the character described, a housing, means for delivering stock to said housing, a feed roll mounted in the housing, a gate coacting with the feed roll in admitting grain to the crushing rolls, said gate being positioned slightly in advance of a vertical line extending diametrically through the feed roll, a shaft mounted in the housing at the rear of said vertical line and to which the gate is secured, a lever fixed to said shaft to rock the same, a pivotally mounted controller board mounted in the housing above the gate, and an arm fixed to said controller board and having a curved face to actuate the lever.

In testimony whereof I affix my signature, in the presence of two witnesses.

PHILIP H. LAWSON.

Witnesses:
F. G. FISCHER,
L. J. FISCHER.